United States Patent
Tsirkin (10) Patent No.: US 9,009,702 B2
(45) Date of Patent: Apr. 14, 2015

(54) APPLICATION-DRIVEN SHARED DEVICE QUEUE POLLING IN A VIRTUALIZED COMPUTING ENVIRONMENT

(75) Inventor: Michael Tsirkin, Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 431 days.

(21) Appl. No.: 13/308,490

(22) Filed: Nov. 30, 2011

(65) Prior Publication Data

US 2013/0139156 A1 May 30, 2013

(51) Int. Cl.
*G06F 9/455* (2006.01)
*G06F 9/54* (2006.01)

(52) U.S. Cl.
CPC .......... *G06F 9/544* (2013.01); *G06F 9/45558* (2013.01); *G06F 2009/45583* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 5,555,414 A * | 9/1996 | Hough et al. | 710/261 |
| 6,141,701 A | 10/2000 | Whitney | |
| 6,363,477 B1 | 3/2002 | Fletcher et al. | |
| 6,760,911 B1 * | 7/2004 | Ye | 719/314 |
| 6,788,697 B1 | 9/2004 | Aweya et al. | |
| 7,596,650 B1 | 9/2009 | Aditya et al. | |
| 8,429,291 B2 | 4/2013 | Evans et al. | |
| 2002/0062356 A1 | 5/2002 | Clarke et al. | |
| 2002/0138578 A1 | 9/2002 | Zhou | |
| 2003/0110232 A1 | 6/2003 | Chen et al. | |
| 2003/0236819 A1 | 12/2003 | Greubel | |
| 2005/0132065 A1 | 6/2005 | Zhou | |
| 2006/0140362 A1 | 6/2006 | Hickson et al. | |
| 2006/0212587 A1 | 9/2006 | Barsuk | |
| 2008/0016236 A1 * | 1/2008 | Beverly et al. | 709/230 |
| 2008/0177872 A1 | 7/2008 | Vengroff | |
| 2008/0307111 A1 | 12/2008 | Wilcock | |
| 2009/0070560 A1 | 3/2009 | Meng et al. | |
| 2009/0240821 A1 | 9/2009 | Juncker et al. | |
| 2011/0023042 A1 * | 1/2011 | Pope et al. | 718/102 |
| 2012/0072914 A1 * | 3/2012 | Ota | 718/100 |
| 2013/0055287 A1 | 2/2013 | Pope et al. | |
| 2013/0104124 A1 | 4/2013 | Tsirkin et al. | |

OTHER PUBLICATIONS

Subramaniam et al, A Communication Library Using Active Messages to Improve Performance of PVM, Iowa State University, 1996, 13 pages.*
USPTO, Office Action for U.S. Appl. No. 13/308,487, Mailed on Jan. 23, 2014.
USPTO, Office Action for U.S. Appl. No. 13/308,487 mailed Jun. 5, 2014.

* cited by examiner

*Primary Examiner* — Diem Cao
(74) *Attorney, Agent, or Firm* — Lowenstein Sandler LLP (57) ABSTRACT

Methods and systems for application-driven polling of shared device queues are provided. One or more applications running in non-virtualized or virtualized computing environments may be adapted to enable methods for polling shared device queues. Applications adapted to operate in a polling mode may transmit a request to initiate polling of shared device queues, wherein operating in the polling mode disables corresponding device interrupts. Applications adapted to operate in a polling mode may be regulated by one or more predefined threshold limitations.

33 Claims, 8 Drawing Sheets

APPLICATION-DRIVEN SHARED DEVICE QUEUE POLLING IN A VIRTUALIZED COMPUTING ENVIRONMENT

TECHNICAL FIELD

Embodiments of the present invention relate to a computer system, and more specifically, to application-driven shared device queue polling in non-virtualized and virtualized computing environments.

BACKGROUND

A computer system generally includes multiple hardware and software resources that are configured to receive and transmit data packets. One such resource is a networking device that may receive data packets from a data network coupled to the computer system. The networking device may be comprised of multiple queues, which may include a combination of dedicated and shared device queues, for managing incoming data packets to be processed by one or more applications running on the computer system.

As data packets arrive at the networking device, they are routed to and temporarily stored in designated device queues based on unique identifiers, such as, for example, a media access control (MAC) address and/or a virtual LAN (VLAN) tag, or some other combination of data provided in the header of the data packet, to allow data packets to be matched with one or more applications running on the computer system.

As data packets are received in device queues of the networking device, interrupt requests (IRQ) are triggered to notify the computer system that there are data packets pending in the device queues, whereby IRQs are transmitted to the processor of the computer system for handling. An IRQ can be sent by means of interrupt messages (e.g., Message Signaled Interrupts (MSI-X)), changes to a voltage level on interrupt pins (e.g., pin-based interrupts), and/or other means. When the processor receives the IRQ from the networking device, it must temporarily halt its processing operations to examine and determine which applications the data packets are intended for.

The foregoing process is associated with significant overhead, involving numerous data packets associated with different interrupts to be passed to one or more applications for processing. As the frequency of data packets arriving at the networking device increases, so does the overhead required for servicing the interrupts, thereby degrading the overall performance of the computer system.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods and systems for application-driven polling of shared device queues are described herein. In one embodiment, one or more processes (applications) running on a host machine may be adapted to enable a method for retrieving data packets (messages) pending in one or more shared device queues associated with a networked device. Similarly, in an another embodiment, one or more applications running on one or more virtual machines, residing on the host machine, may be adapted to enable a method for retrieving messages pending in one or more shared device queues associated with the same or a different networked device.

Embodiments of the present invention allow for one or more applications, running in non-virtualized or virtualized computing environments, to transmit a request to their respective operating systems to poll for pending messages awaiting processing by a corresponding application. The request may identify a collection of sockets associated with the requesting application and provide instructions authorizing the operating system to poll shared device queues associated with the networked device. Shared device queues having previously stored messages for the identified collection of sockets in the past may be queried by the operating system to determine whether there are any pending messages for the corresponding application. When operating in a polling mode, device interrupts associated with messages received in shared device queues that are selected to be queried may be disabled. By enabling polling and disabling interrupts, messages pending in shared device queues of a network device may be processed more efficiently, thereby contributing to a reduction in latency commonly associated with high-speed computer networks.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1A:
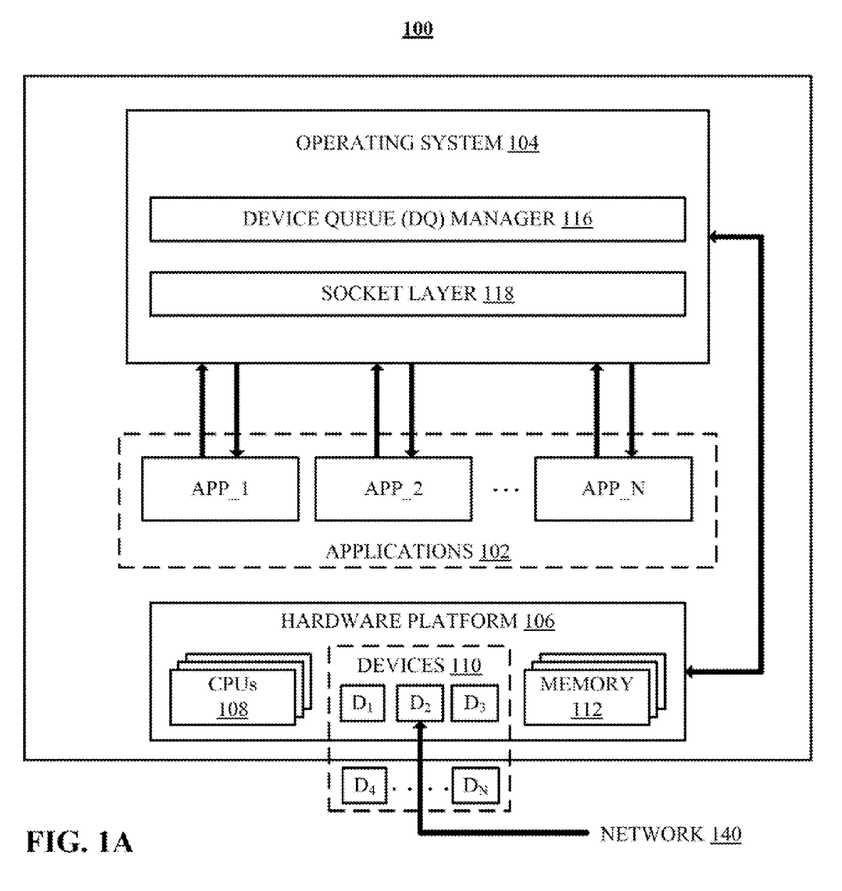
FIGS. 1A-1B are block diagrams illustrating, respectively, a non-virtualized computer system and a virtualized computer system in accordance with embodiments of the present invention.
Figure 1B:
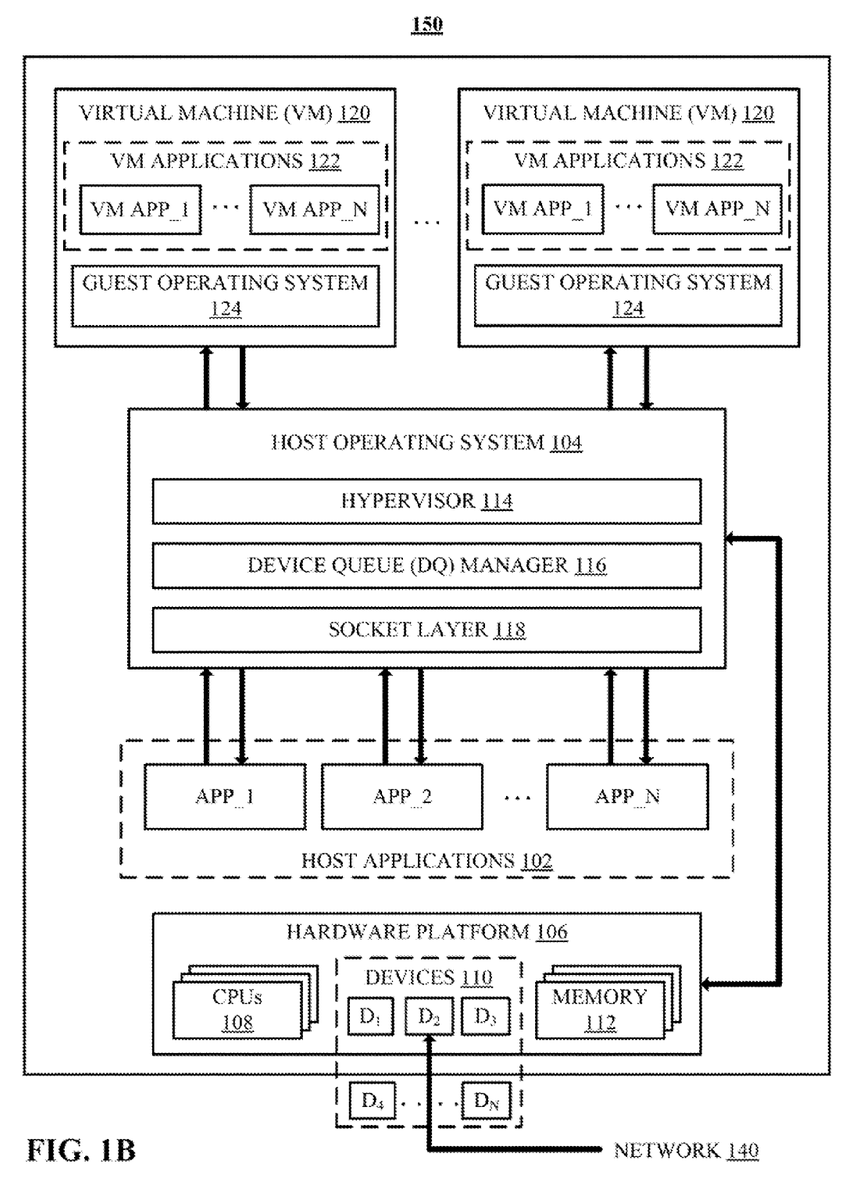

FIGS. 1A and 1B are block diagrams illustrating exemplary computer systems in accordance with embodiments of the present invention. In one embodiment, a computer system 100 (FIG. 1A) may be employed for enabling the present invention in a non-virtualized computing environment. In another embodiment, a computer system 150 (FIG. 1B) may be employed for enabling the present invention in a virtualized computing environment. As will be apparent from the description that follows, computer system 100 and computer system 150 interact with common elements throughout, wherein additional elements are identified in connection with computer system 150 to further enable the present invention to operate in the virtualized computing environment.

Computer systems 100 and 150 may be host machines connected to a network such as, for example, a server computer, a gateway computer or any other suitable computer system that is configurable for operating as a host. Each of computer systems 100 and 150 comprise one or more host applications 102, a host operating system 104 and a hardware platform 106. Operating system 104 may include Microsoft Windows®, Linux®, Solaris®, Mac® OS or any other suitable operating system for managing operations on computer systems 100 and 150.

Hardware platform 106 may include one or more of the following hardware components: central processing units (CPUs) 108, devices 110 and memory 112. Devices 110 may be comprised of a plurality of hardware and software devices, which may be located internally and externally to computer systems 100 and 150. Examples of devices 110 include network interface cards (NICs), storage devices, sound or video adaptors, photo/video cameras, printer devices, keyboards, displays or any other suitable device intended to be coupled to a computer system.

In a virtualized environment, host computer system 150 of FIG. 1B is additionally configured with one or more virtual machines (VMs) 120. A virtual machine is a portion of software that, when executed on appropriate hardware, creates an environment allowing the virtualization of an actual physical computer system. Each of VMs 120 may function as a self-contained platform, comprising one or more applications 122 and running a corresponding guest operating system 124. Guest operating system 124 provided in each of VMs 120 may run the same or different operating systems. Similar to host operating system 104, operating system 124 may include Microsoft Windows®, Linux®, Solaris®, Mac® OS or any other suitable operating system for managing operations associated with a virtualization environment.

A hypervisor 114, which emulates the underlying hardware platform 106 for VMs 120, is provided and may run on host operating system 104. A hypervisor is also known as a virtual machine monitor (VMM), a kernel-based hypervisor or a host operating system. Hypervisor 114 may support multiple VMs 120 residing on host computer system 150. Alternatively, more than one hypervisor (not shown) may be provided to support multiple VMs 120 residing on host computer system 150. In a virtualized configuration, there is no requirement to run a hypervisor on a full-featured host operating system. So called bare metal hypervisors include task scheduler and/or device drivers, similar to full-featured host operating systems, as well as hypervisor functions related to emulation and executing privileged instructions on behalf of virtual machines. In other configurations, part of the functionality of the host operating systems, such as device drivers, might be delegated to a privileged virtual machine running on the hypervisor.

The term host operating system, when applied to such a virtualized setup, is taken to include the parts of the system performing host operating system functions, including working with devices and scheduling tasks on the host CPUs. Further, the term hypervisor, when applied to such a virtualized setup, is taken to include the parts of the system performing hypervisor functions related to emulation and executing privileged instructions on behalf of virtual machines.

One or more applications 102 running directly on host computer system 100 and one or more applications 122 running via one or more VMs 120 (VM applications) residing on host computer system 150 may receive messages from a network 140 via device 110 (e.g., device "D2" may be a network interface controller (NIC) or a network card such as an Ethernet network card). Network 140 may be a private network (e.g., a local area network (LAN), wide area network (WAN), intranet, etc.) or a public network (e.g., the Internet).

According to one embodiment of the present invention, when application 102 wants to operate in a polling mode, it may transmit a request to host operating system 104 to enable polling and allow host operating system 104 to query for messages destined for the requesting application. Host operating system 104 may query a portion of memory 112 allocated for storing messages retrieved from shared device queues, as well as shared device queues associated with one or more devices 110 having pending messages stored thereon.

In one embodiment, the request identifies a collection of sockets associated with application 102. The collection of sockets identified by application 102 may be managed, for example, by an application socket layer 118 provided in host operating system 104. In response to the request, host operating system 104 may query a portion of memory 112 allocated for storing messages already retrieved from device queues and may make a determination whether any of those messages are pending for the sockets associated with application 102.

In one embodiment, if there are no messages pending in the allocated memory queried by host operating system 104, host operating system 104 may then further query specific shared device queues that are known to have previously stored messages passed to the collection of sockets associated with application 102 in the past. Host operating system 104 may include a device queue (DQ) manager 116 to identify one or more shared device queues that have previously stored messages passed to the collection of sockets in the past. DQ manager 116 may access one or more records (e.g., a mapping table associating device queues with application socket identifiers) stored in a portion of memory 112 allocated to DQ manager 116 to identify shared device queues to be queried by host operating system 104 for pending massages.

According to another embodiment of the present invention, VM application 122 running on VM 120 residing on host computer system 150 (FIG. 1B) may also operate in a polling mode. To enable polling in a virtualized environment, VM application 122 may transmit a request to guest operating system 124 of its corresponding VM 120. Guest operating system 124, through the use of hypervisor 114, may then query for pending messages destined for VM application 122. Similar to host operating system 104, guest operating system 124 may query, using hypervisor 114, a portion of memory 112 allocated for storing messages retrieved from shared device queues, as well as the shared device queues themselves having pending messages stored thereon.

Figure 2A:
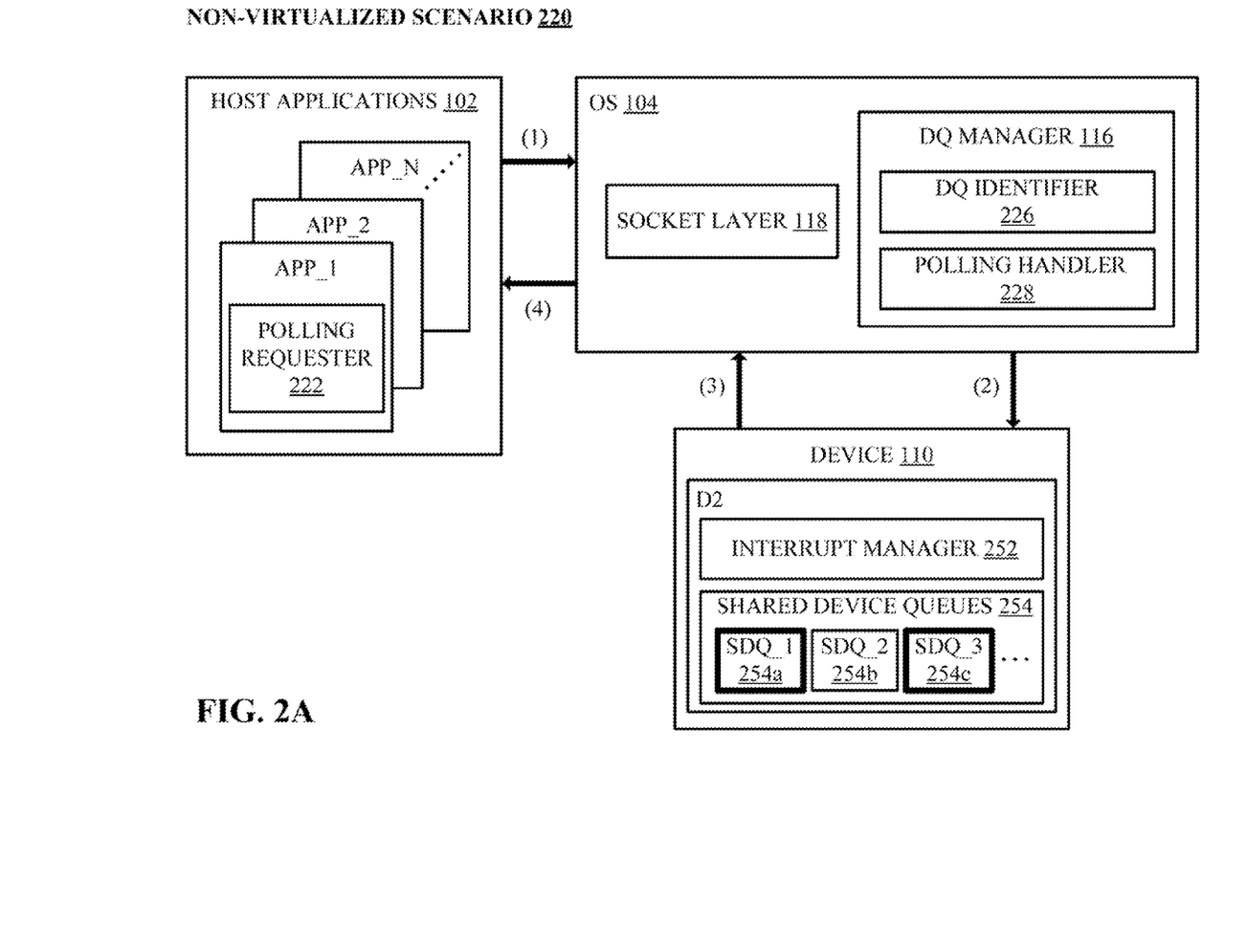
FIGS. 2A-2B are block diagrams illustrating embodiments of an application-driven polling of shared device queues, respectively, in non-virtualized and virtualized computing environments.
Figure 2B:
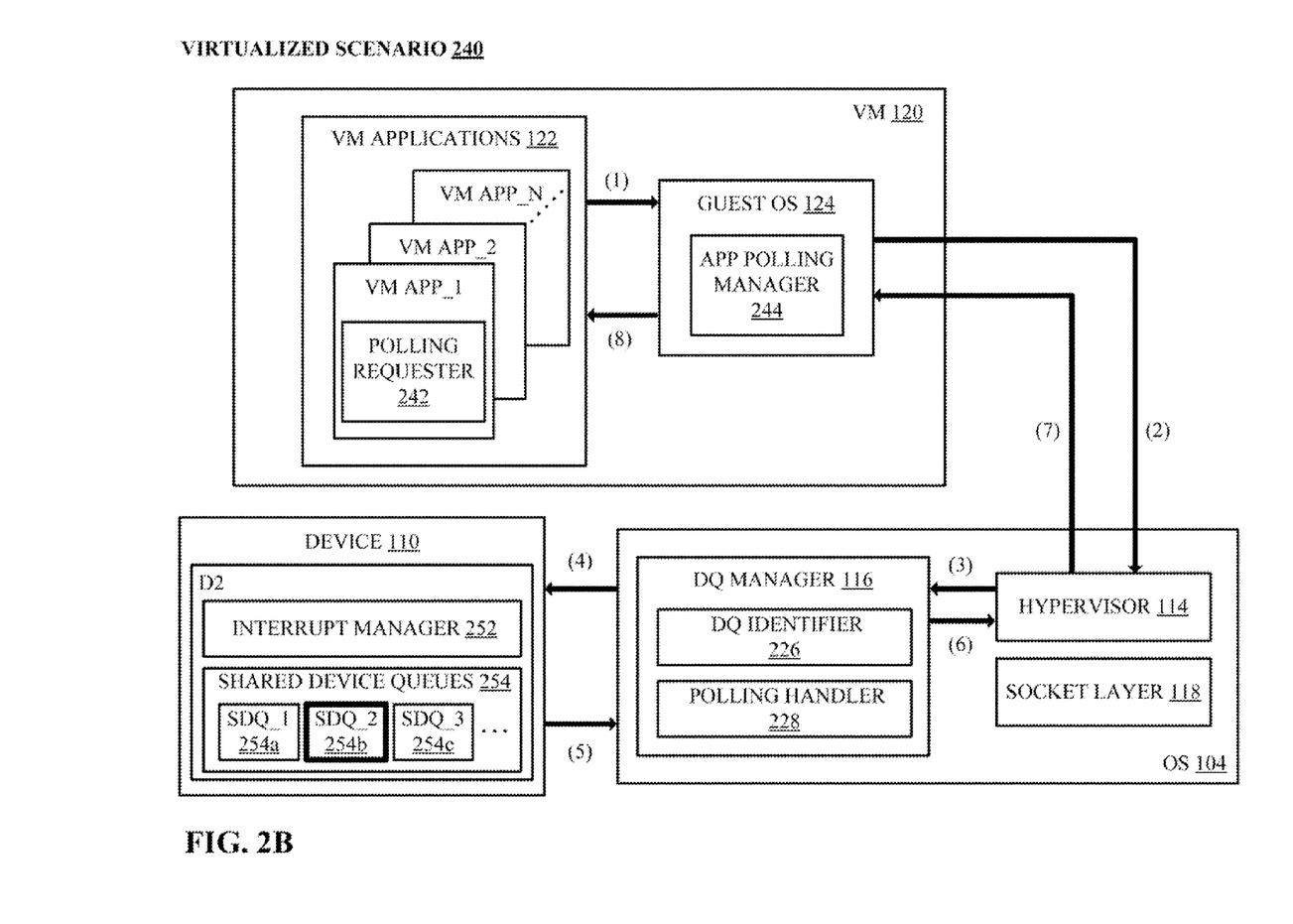

Application-driven polling of shared device queues, as described in conjunction with computer systems 100 of FIG. 1A and computer system 150 of FIG. 1B, is described in additional detail with reference to FIGS. 2A and 2B. FIG. 2A is a block diagram illustrating one embodiment of a non-virtualized scenario 220 for application-driven polling of shared device queues. FIG. 2B is a block diagram illustrating one embodiment of a virtualized scenario 240 for application-driven polling of shared device queues.

Referring to non-virtualized scenario 220 in FIG. 2A, provided is one or more host applications 102 running on computer system 100 or computer system 150 that may operate in a polling mode. In one embodiment, to operate in a polling mode, the one or more host applications 102 may be adapted with a polling requester module 222. When polling mode is desired by host application 102, polling requester module 222 may be configured to transmit a request to host operating system 104, wherein the request may be received and processed by component modules of DQ manager 116. In one embodiment, permitting host application 102, adapted with polling requester 222, to operate in a polling mode may be a user-configurable option for selective enabling and disabling of the operation.

In one embodiment, DQ manager 116 may be comprised of a device queue (DQ) identifier module 226 and a polling handler module 228 for processing the request received from host application 102 to operate in a polling mode. DQ identifier module 226 may work in conjunction with socket layer 118 to match the collection of sockets identified by host application 102 with shared device queues that previously stored messages passed to those sockets. Polling handler module 228 may transmit instructions to an interrupt manager 252 associated with device 110 (e.g., NIC "D2") to inform device 110 that host application 102 has requested to poll for messages stored in one or more of its shared device queues 254.

Upon receiving the instructions from polling handler module 228, interrupt manager 252 may be configured to disable device interrupts associated with the one or more shared device queues 254 identified by DQ identifier module 226. For example, a shared device queue 254a ("SDQ_1") and a shared device queue 254c ("SDQ_3") may be identified by DQ identifier module 226 as shared device queues that previously stored messages passed to the collection of sockets associated with host application 102 in the past. Accordingly, interrupt manager 252, upon receiving instructions from polling handler module 228 to enable polling of shared device queues 254a and 254c, may be configured to disable device interrupts associated with shared device queues 254a and 254c while polling for messages in these shared device queues is in progress.

In one embodiment, polling handler module 228 of DQ manager 116 provided in host operating system 104 is configured to drive the process of polling identified shared device queues 254 in any one of devices 110. In another embodiment, more than one polling handler module 228 may be provided, wherein each of the plurality of modules 228 is designated to manage polling of shared device queues associated with a subset group of devices 110. In polling shared device queues 254a and 254c, messages intended for the identified collection of sockets associated with host application 102 are retrieved by DQ manager 116 and passed to host application 102. Messages retrieved by DQ manager 116 to be passed to host application 102 may be temporarily stored in a memory space accessible by host application 102 while it is notified of the availability of messages retrieved.

Referring to virtualized scenario 240 in FIG. 2B, provided is one or more VM applications 122 running on one or more VMs 120 residing on host computer system 150 that may operate in a polling mode. In one embodiment, similar to host application 102, to operate in a polling mode, the one or more VM applications 122 may be adapted with a polling requester module 242. When polling mode is desired by VM application 122, polling requester module 242 may be configured to transmit a request to guest operating system 124 of VM 120, wherein the request may be received by an application polling manager 244 and relayed to hypervisor 114 for processing by component modules of DQ manager 116. In one embodiment, similar to host application 102 adapted with polling requester 222, permitting VM application 122, adapted with polling requester 242, to operate in a polling mode may be a user-configurable option for selective enabling and disabling of the operation. In another embodiment, a user-configurable option for selective enabling and disabling of the polling operation may be provided in connection with application polling manager 244 of guest operating system 124.

As previously described, in one embodiment, DQ manager 116 may be comprised of DQ identifier module 226 and polling handler module 228 for processing the request received from VM application 122 to operate in a polling mode. DQ identifier module 226 may work in conjunction with socket layer 118 to match the collection of sockets identified by VM application 122 with shared device queues that have previously stored messages passed to those sockets. Polling handler module 226 may transmit instructions to interrupt manager 252 associated with device 110 (e.g., NIC "D2") to inform device 110 that VM application 122 has requested to poll for messages stored in one or more of its shared device queues 254.

Upon receiving the instructions from polling handler module 228, interrupt manager 252 may be configured to disable device interrupts associated with the one or more shared device queues 254 identified by DQ identifier module 226. For example, a shared device queue 254b ("SDQ_2") may be identified as a shared device queue that previously stored messages passed to the collection of sockets associated with VM application 122 in the past. Accordingly, interrupt manager 252, upon receiving instructions from polling handler module 228 to poll shared device queue 254b for messages, may be configured to disable device interrupts associated with shared device queue 254b while polling is in progress.

In polling shared device queue 254b, messages intended for the identified collection of sockets associated with VM application 122 are retrieved by DQ manager 116 and passed to hypervisor 114 for subsequent delivery of the retrieved messages to VM application 122 by guest operating system 124. Messages retrieved by DQ manager 116 to be passed to VM application 122 may be temporarily stored in a memory space accessible by VM application 122 while it is notified of the availability of messages retrieved.

Figure 3A:
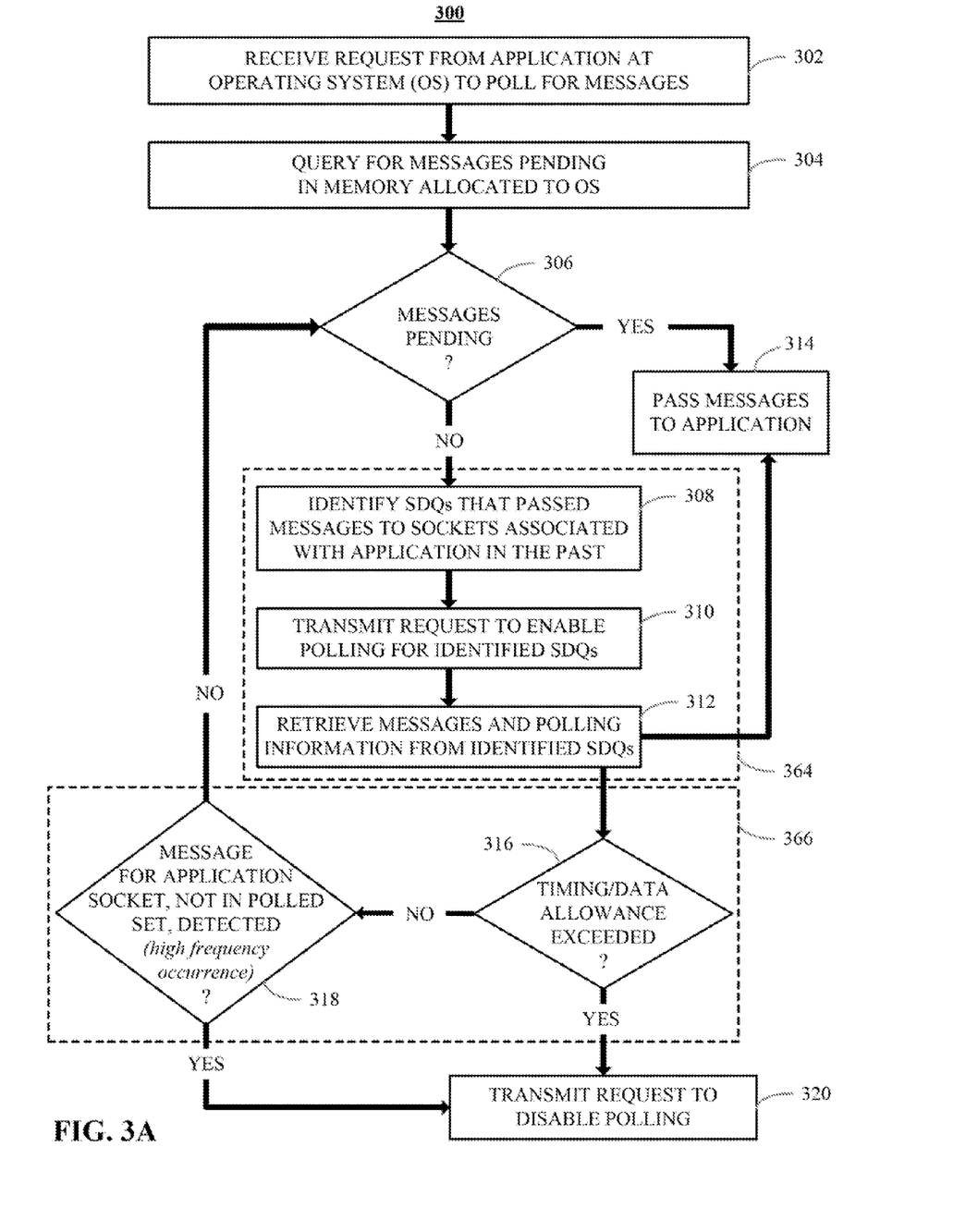
FIGS. 3A-3B are flow diagrams illustrating embodiments of methods for application-driven polling of shared device queues, respectively, in non-virtualized and virtualized computing environments.
Figure 3B:
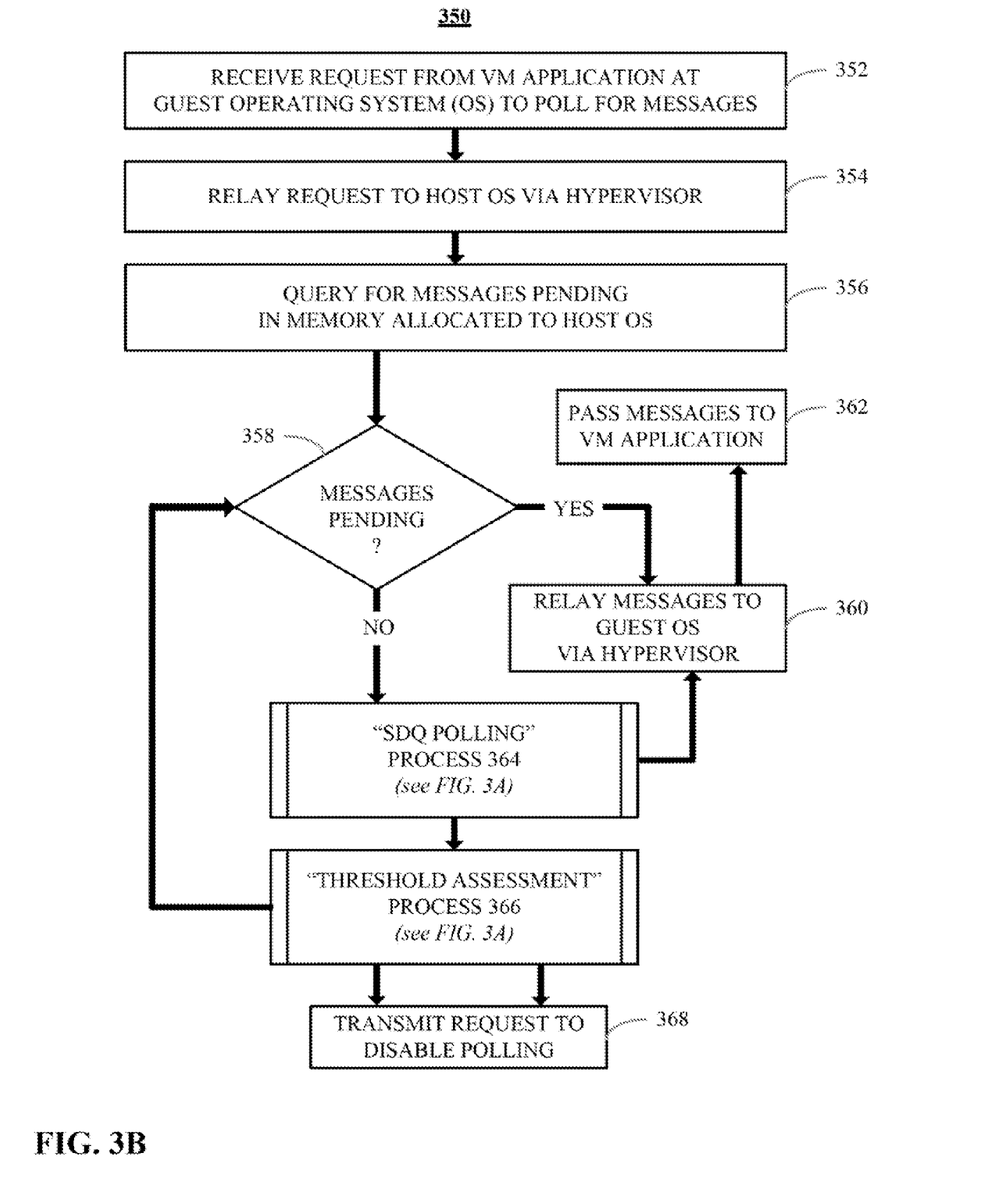
Figure 4:
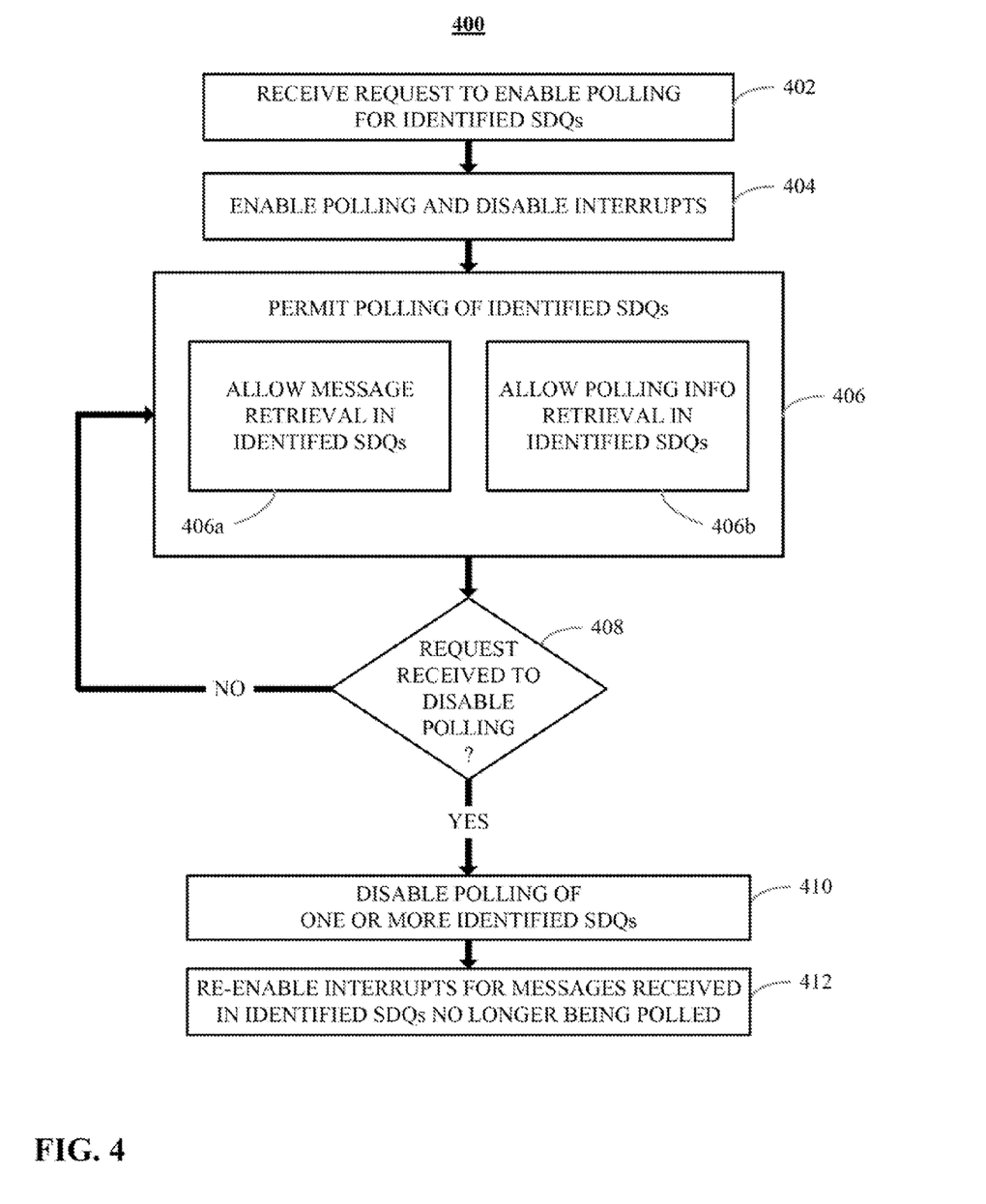
FIG. 4 is a flow diagram illustrating an embodiment of a method for handling a request received at a device to enable polling of shared device queues, and managing disabling and re-enabling of corresponding device interrupts.

Methods for application-driven polling of shared device queues in non-virtualized and virtualized computing environments are described herein with references to FIGS. 3A-3B and FIG. 4, which illustrate process flows that may be engaged in, respectively, by operating systems and by devices embodied in the present invention. FIG. 3A is a flow diagram illustrating one embodiment of a method 300 for application-driven polling of a shared device queue in a non-virtualized computing environment, as previously described in conjunction with FIGS. 1A and 2A. FIG. 3B is a flow diagram illustrating one embodiment of a method 350 for application-driven polling of a shared device queue in a virtualized computing environment, as described in conjunction with FIGS. 1B and 2B. FIG. 4 is a flow diagram illustrating one embodiment of a method 400 for handling a request to enable polling of one or more shared device queues in both non-virtualized and virtualized computing environments, and managing disabling and re-enabling of corresponding device interrupts.

Methods 300, 350 and 400 may be performed by processing logic (e.g., in computer system 500 of FIG. 5) that may comprise hardware (e.g., circuitry, dedicated logic, programmable logic, microcode, etc.), software (such as instructions run on a processing device), firmware, or a combination thereof. In one embodiment, methods 300 and 350 are initiated, respectively, by host applications 102 and VM applications 122 that are adapted to transmit a request to poll for messages. The process of polling for messages, as described in methods 300 and 350, are driven primarily by the previously described DQ manager 116 of host operating system 104. In one embodiment, method 400 awaits receipt of an instruction from DQ manager 116 to disable device interrupts and allow for polling of identified shared device queues. The process of disabling and re-enabling device interrupts, as described in method 400, are driven primarily by the previously described interrupt manager 252 of device 110.

Referring to FIG. 3A, method 300 may be initiated when host operating system 104 receives a request (block 302) from one or more host applications 102 to poll for messages. Upon receiving the request, host operating system 104 may query (block 304) a portion of memory 112 for pending messages awaiting delivery to host applications 102. The portion of memory 112 queried by host operating system 104 may be memory space specifically allocated for storing messages retrieved from device queues that are waiting to be passed to the appropriate application. A determination is made (block 306) whether there are any messages pending in the portion of memory queried by operating system 104. If so, the pending messages are retrieved and passed (block 314) to the one or more host applications 102.

If there are no messages pending in the portion of memory queried by host operating system 104, host operating system 104 may proceed to identify (block 308) shared device queues 254 associated with one or more devices 110 that previously stored messages passed to the collection of sockets associated with the one or more host applications 102 in the past. In one embodiment, shared device queues 254 may be identified by DQ identifier module 226 of DQ manager 116 (FIG. 2A) provided in host operating system 104. When the relevant shared device queues 254 have been identified, polling handler 228 of DQ manager 116 may transmit (block 310) a request to corresponding device(s) 110 to enable polling for messages in the identified shared device queues 254. Thereafter, polling for messages is enabled, allowing DQ manager 116 to retrieve (block 312) messages in the identified shared device queues 254 and pass (block 314) the messages to host applications 102.

Polling of shared device queues 254 may continue until a determination is made (block 316) that a threshold value has been met or exceeded, or a determination is made to stop running host application 102. In one embodiment, the threshold value may be a value predefined by host application 102 and passed to host operating system 104 at the time the request to poll for messages is received from host application 102. In another embodiment, the threshold value may be a value which is predefined by DQ manager 116 in host operating system 104. Polling handler 228 of DQ manager 116 may obtain polling information from shared device queues 254 while retrieving messages for host application 102 to make the determination whether the threshold value has been met or exceeded. In one embodiment, the threshold value may be representative of a time period permitted for polling said shared device queues 254. In another embodiment, the threshold value may be representative of a data allowance limit permitted for polling shared device queues 254. When a determination is made that one or more of these threshold values have been met or exceeded, polling handler 228 may transmit (block 320) a request to disable polling of one or more of the affected shared device queues 254. The request to disable polling, similar to the request to enable polling, may be transmitted to interrupt manager 252 of device 110 for handling.

Polling may also be regulated based on the messages received at shared device queues 254. Where multiple host applications 102 are requesting polling from the same shared device queue, polling handler 228 of DQ manager 116 may be configured to manage retrieval of messages for the multiple host applications 102 by permitting DQ manager to switch from retrieving messages for one application in polling mode to another application in polling mode. For example, if two host applications 102 have requested polling of a shared device queue, DQ manager 116 may begin retrieving messages for a first host application 102 until a determination is made by polling handler 228 that messages for a second host application 102 are available. Upon making this determination, DQ manager 116 may immediately switch to retrieving messages for the second host application 102. In another embodiment, DQ manager 116 may be configured to wait until a certain number of messages are received at the shared device queue to switch from retrieving messages for the first host application 102 in polling mode to the second host application 102 in polling mode.

The same shared device queue may also receive messages for one or more host applications 102 that have not requested, or are not enabled to request, polling for messages. In this embodiment, delivery of messages may be temporarily suspended while polling of the shared device queue is engaged by one or more host applications 102. For example, if a shared device queue being polled receives a message for an application socket, which is not in the collection of sockets associated with host application 102 for which polling is being conducted (i.e., it is a message received for another application not adapted or engaged in a polling mode), that message may be kept in the shared device queue until polling for host application 102 is completed.

A determination may be made (block 318) whether there is a high frequency occurrence of messages being received by the shared device queue for application sockets, which are not in the collection of sockets associated with host application 102, exceeding a permissible value and, thereby, resulting in a backlog and corresponding delay in processing of these messages by their respective applications. Again, to make the determination, a threshold value may be predefined and monitored by polling handler 228 of DQ manager 116 through the collection of polling information retrieved from shared device queues 254.

In one embodiment, the threshold value may be representative of a time period in which a message received for an application socket, which is not in the collection of sockets associated with host application 102, is permitted to remain in shared device queue 254 during polling mode. Timing information for messages stored in shared device queue 254 may be polled by DQ manager 116 while in the process of polling for messages intended for sockets associated with host application 102. The timing information may identify, for example, when the message was placed in shared device queue 254 to determine how long the message has been pending in shared device queue 254 awaiting processing. In another embodiment, the threshold value may be representative of the number of different application sockets, which are not in the collection of sockets associated with host application 102, permitted to have messages pending in shared device queue 254 during polling mode. In yet another embodiment, the threshold value may be representative of a total number of messages intended for application sockets, which are not in the collection of sockets associated with host application 102, permitted to be pending in shared device queue 254 during polling mode. When a determination is made that one or more of these threshold values have been met or exceeded, polling handler 228 may transmit (block 320) a request to disable polling of one or more of the affected shared device queues 254. The request to disable polling, similar to the request to enable polling, may be transmitted to interrupt manager 252 of device 110 for handling.

For purposes of brevity, and not by way of limitation, the actions described above in method 300 that are associated with identifying and retrieving messages from shared device queues 352 (i.e., blocks 308, 310 and 312) are collectively referred to herein as an "SDQ polling process" (represented as predefined process block 364), as referenced in method 350 of FIG. 3B. Also, the actions described above in method 300 that are associated with assessing permissible thresholds to regulate polling of shared device queues 352 (i.e., blocks 316 and 318) are collectively referred to herein as a "threshold assessment process" (represented as predefined process block 366), as referenced in method 350 of FIG. 3B.

Referring to FIG. 3B, method 350 may be initiated when guest operating system 124 receives (block 352) a request from one or more VM applications 122 to poll for messages. Upon receiving the request, guest operating system 124 may relay (block 354) the request, via application polling manager 244, to hypervisor 114 in order to allow corresponding host operating system 104 to query (block 356) a portion of memory 112 for pending messages awaiting delivery to VM applications 122. As in method 300 of FIG. 3A, a determination is made (block 358) whether there are any messages pending in the portion of memory 112 queried by operating system 104. If so, the pending messages are retrieved from the portion of memory 112 and relayed (block 360) to guest operating system 124 via hypervisor 114 in order to be passed (block 362) to the one or more VM applications 122. In one embodiment, the pending messages retrieved from the portion of memory 112 allocated to host operating system 104 and relayed to guest operating system 124, via hypervisor 114, may also be temporarily stored in a portion of memory 112 allocated to guest operating system 112 until they can be passed to VM application 122.

If there are no messages pending in the portion of memory 112 queried by host operating system 104, host operating system 104 may then engage the SDQ polling process (predefined process block 364). The SDQ polling process may operate in the same manner as previously described in connection with method 300 of FIG. 3A, comprising identifying shared device queues 254 associated with one or more devices 110 that previously stored messages passed to the collection of sockets associated with the one or more VM applications 122 in the past, transmitting a request to corresponding device(s) to enable polling for messages in the identified shared device queues 254, and retrieving those messages from the identified shared device queues 254 being polled. The retrieved messages may then be relayed (block 360) to guest operating system 124, via hypervisor 114, to be passed (block 362) to VM application 122.

As described in the context of the non-virtualized environment of method 300, polling of shared device queues 254 for VM applications 122 in method 350 may continue until a determination is made that one or more particular threshold values have been met or exceeded, a determination is made by guest operating system 124 to stop running VM application 122, or a determination is made by host operating system 104 to stop running a part of hypervisor 114 responsible for running VM application 122 or passing messages from shared device queues to VM application 122. Host operating system 104 may engage the threshold assessment process (predefined process block 366) to make these determinations. The SDQ polling process may operate in the same manner as previously described in connection with method 300 of FIG. 3A, comprising collecting and assessing information related to polling of the identified shared device queues 254. When a determination is made that one or more of the threshold values have been met or exceeded, polling handler 228 may transmit (block 368) a request to disable polling of one or more of the affected shared device queues 254. The request to disable polling, similar to the request to enable polling, may be transmitted to interrupt manager 252 of device 110 for handling.

Referring to FIG. 4, method 400 may be initiated when device 110 receives (block 402) a request from host operating system 104 to enable polling for identified shared device queues 254, as may be determined in methods 300 and 350 using DQ identifier 226 of DQ manager 116. In one embodiment, the request to enable polling of the select device queues may be received at interrupt manager 252 of device 110. Upon receiving the request to enable polling, interrupt manager 252 may enable polling and disable device interrupts (block 404) for the identified shared device queues 254 and permit (block 406) DQ manager 116 of host operating system 104 to poll for messages in the identified shared device queues 254. In permitting polling of the identified shared device queues 254, interrupt manager 252 of device 110 may allow messages and polling information to be retrieved (blocks 406a and 406b, respectively) by DQ manager 116.

Interrupt manager 252 may permit polling of the identified shared device queues 254 until a determination is made (block 408) that a request has been received to disable polling. The request to disable polling, as may be determined by the threshold assessment process identified in methods 300 and 350, may be transmitted by polling handler 228 of DQ manager 116. Upon receiving the request, interrupt manager 252 may disable (block 410) polling of those shared device queues 254 for which the request applies and re-enable (block 412) device interrupts for messages received in shared device queues 254 that are no longer being polled.

Figure 5:
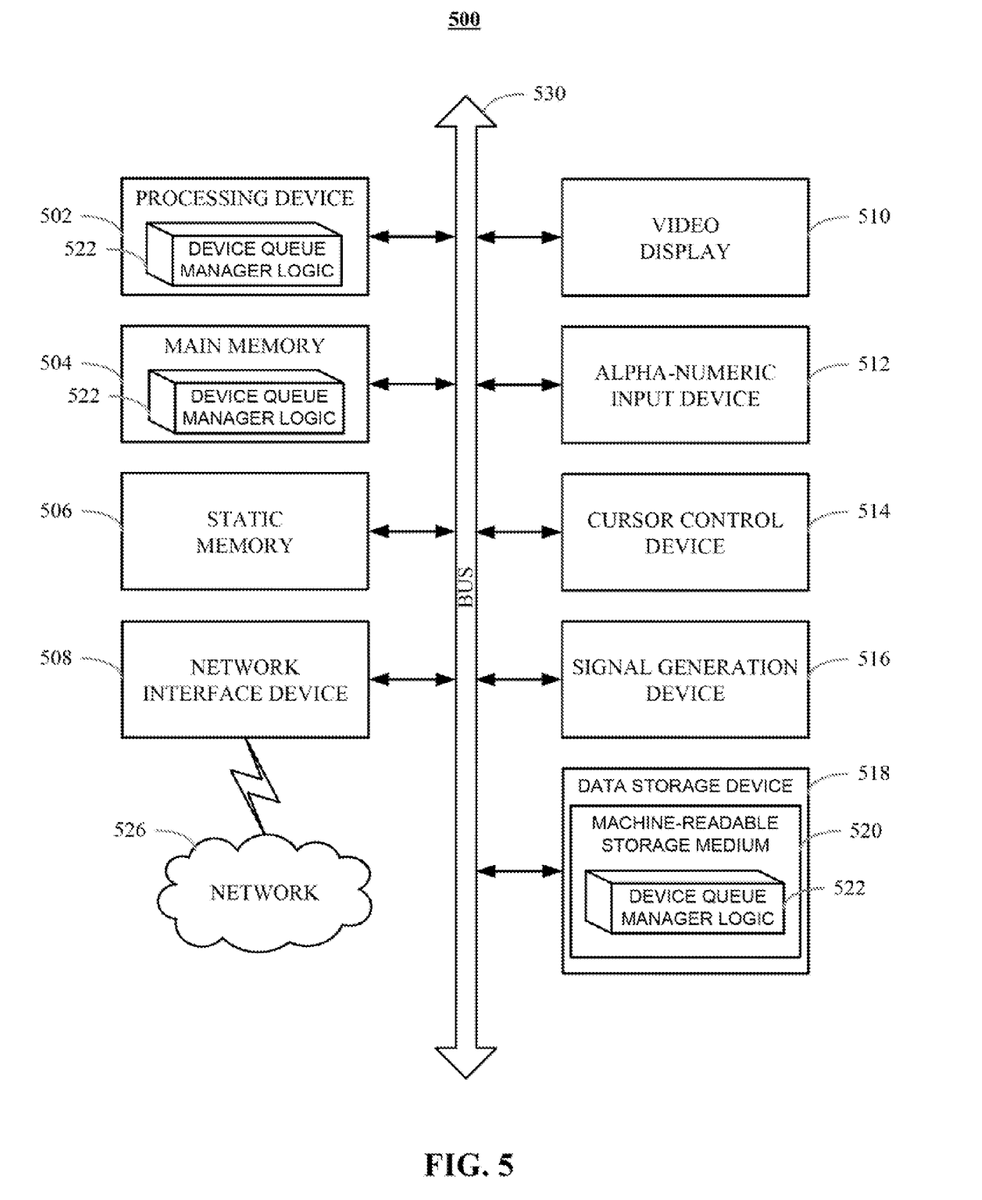
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute device queue manager logic 522 for performing the operations and steps discussed herein.

Computer system 500 may further include a network interface device 508. Computer system 300 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions (e.g., device queue manager logic 522) embodying any one or more of the methodologies of functions described herein (e.g., DQ manager 116 of FIG. 1). Device queue manager logic 522 may also reside, completely or at least partially, within main memory 504 and/or within processing device 502 during execution thereof by computer system 500; main memory 504 and processing device 502 also constituting machine-readable storage media. Device queue manager logic 522 may further be transmitted or received over a network 526 via network interface device 508.

Machine-readable storage medium 520 may also be used to store the device queue manager logic persistently. While machine-readable storage medium 520 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "receiving", "requesting", "querying", "identifying", "retrieving", "determining", "relaying", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

engaging a hypervisor to process a request at a host operating system, said request received from an application, identifying one or more sockets associated with said application, and providing instructions to poll for messages;

in response to said request, determining whether a message, having an association with a first one of said one or more sockets, is stored in a memory space associated with said host operating system, wherein said message when stored in said memory space is to be passed to said application via said hypervisor;

identifying, by a processing device, a shared device queue of at least one device having previously stored messages for a second one of said one or more sockets associated with said application;

transmitting said instructions to said at least one device to enable polling of said shared device queue;

in response to said instructions to enable polling, determining whether a second message is stored in said shared device queue; and determining whether said second message has an association with the second one of said sockets associated with said application, wherein said second message when stored in said shared device queue is to be passed to said application via said hypervisor.

2. The method of claim 1, further comprising defining a threshold value associated with said polling of said shared device queue, wherein said polling of said shared device queue is disabled when a determination is made that said threshold value has been met or exceeded.

3. The method of claim 2, wherein said instructions are generated at said host operating system, or at said hypervisor and communicated to said host operating system, and transmitted to said at least one device upon determining said threshold value has been met or exceeded to disable said polling of said shared device queue.

4. The method of claim 2, wherein said request received at said host operating system further comprises identifying said threshold value.

5. The method of claim 2, wherein said threshold value is representative of a time period permitted for polling said shared device queue.

6. The method of claim 2, wherein said threshold value is representative of a data allowance limit permitted for polling said shared device queue.

7. The method of claim 2, wherein said threshold value is representative of a time period in which a message intended for a socket, not included in said one or more sockets associated with said application, is permitted to remain in said shared device queue during said polling.

8. The method of claim 2, wherein said threshold value is representative of a total number of messages for different sockets, not included in said one or more sockets associated with said application, permitted in said shared device queue during said polling.

9. The method of claim 1, wherein said polling of said shared device queue for messages follows a determination that there are no messages for said one or more sockets associated with said application in said memory space.

10. The method of claim 1, wherein said polling of said shared device queue is disabled upon a determination made by a guest operating system to stop running the application.

11. The method of claim 1, wherein said polling of said shared device queue is disabled upon a determination made by said host operating system to stop running at least a part of said hypervisor, said part of said hypervisor being responsible for running said application, or said part of said hypervisor being responsible for passing messages from said shared device queues to said application.

12. A computer system, comprising:

a memory;

a processing device, coupled to said memory; and a host operating system hosted by said computer system, having access to said memory and use of said processing device, said host operating system to communicate, via a hypervisor, with a guest operating system of a virtual machine, said host operating system to:

engage the hypervisor to process a request at the host operating system, said request received from an application, identifying one or more sockets associated with said application, and providing instructions to poll for messages;

in response to said request, determine whether a message, having an association with a first one of said one or more sockets, is stored in a memory space associated with said host operating system, wherein said message when stored in said memory space is to be passed to said application via said hypervisor;

identify a shared device queue of at least one device having previously stored messages for a second one of said one or more sockets associated with said application;

transmit said instructions to said at least one device to enable polling of said shared device queue;

in response to said instructions to enable polling, determine whether a second message is stored in said shared device queue; and determine if said second message has an association with the second one of said sockets associated with said application, wherein said second message when stored in said shared device queue is to be passed to said application via said hypervisor.

13. The computer system of claim 12, wherein said host operating system is further to define a threshold value associated with said polling of said identified shared device queue, wherein said polling of said shared device queue is disabled when a determination is made that said threshold value has been met or exceeded.

14. The computer system of claim 13, wherein said instructions are generated at said host operating system, or at said hypervisor and communicated to said host operating system, and transmitted to said at least one device upon determining said threshold value has been met or exceeded to disable said polling of said shared device queue.

15. The computer system of claim 13, wherein said request received at said host operating system further comprises identifying said threshold value.

16. The computer system of claim 13, wherein said threshold value is representative of a time period permitted for polling said shared device queue.

17. The computer system of claim 13, wherein said threshold value is representative of a data allowance limit permitted for polling said shared device queue.

18. The computer system of claim 13, wherein said threshold value is representative of a time period in which a message intended for a socket, not included in said one or more sockets associated with said application, is permitted to remain in said shared device queue during said polling.

19. The computer system of claim 13, wherein said threshold value is representative of a total number of messages for different sockets, not included in said one or more sockets associated with said application, permitted in said shared device queue during said polling.

20. The computer system of claim 12, wherein said polling of said shared device queue for messages follows a determination that there are no messages for said one or more sockets associated with said application in said memory space.

21. The computer system of claim 12, wherein said polling of said shared device queue is disabled upon a determination made by a guest operating system to stop running the application.

22. The computer system of claim 12, wherein said polling of said shared device queue is disabled upon a determination made by said host operating system to stop running at least a part of said hypervisor, said part of said hypervisor being responsible for running said application, or said part of said hypervisor being responsible for passing messages from said shared device queues to said application.

23. A non-transitory computer-readable storage medium programmed to include instructions that, when executed by a processing device, cause the processing device to perform operations comprising:

engaging a hypervisor to process a request at a host operating system, said request received from an application, identifying one or more sockets associated with said application, and providing instructions to poll for messages;

in response to said request, determining whether a message, having an association with a first one of said one or more sockets, is stored in a memory space associated with said host operating system, wherein said message when stored in said memory space is to be passed to said application via said hypervisor;

identifying, by the processing device, a shared device queue of at least one device having previously stored messages for a second one of said one or more sockets associated with said application;

transmitting said instructions to said at least one device to enable polling of said shared device queue;

in response to said instructions to enable polling, determining whether a second message is stored in said shared device queue; and determining whether said second message has an association with the second one of said sockets associated with said application, wherein said second message when stored in said shared device queue is to be passed to said application via said hypervisor.

24. The non-transitory computer-readable storage medium of claim 23, wherein the operations further comprises defining a threshold value associated with said polling of said shared device queue, wherein said polling of said shared device queue is disabled when a determination is made that said threshold value has been met or exceeded.

25. The non-transitory computer-readable storage medium of claim 24, wherein said instructions are generated at said host operating system, or at said hypervisor and communicated to said host operating system, and transmitted to said at least one device upon determining said threshold value has been met or exceeded to disable said polling of said shared device queue.

26. The non-transitory computer-readable storage medium of claim 24, wherein said request received at said host operating system further comprises identifying said threshold value.

27. The non-transitory computer-readable storage medium of claim 24, wherein said threshold value is representative of a time period permitted for polling said shared device queue.

28. The non-transitory computer-readable storage medium of claim 24, wherein said threshold value is representative of a data allowance limit permitted for polling said shared device queue.

29. The non-transitory computer-readable storage medium of claim 24, wherein said threshold value is representative of a time period in which a message intended for a socket, not included in said one or more sockets associated with said application, is permitted to remain in said shared device queue during said polling.

30. The non-transitory computer-readable storage medium of claim 24, wherein said threshold value is representative of a total number of messages for different sockets, not included in said one or more sockets associated with said application, permitted in said shared device queue during said polling.

31. The non-transitory computer-readable storage medium of claim 23, wherein said polling of said shared device queue for messages follows a determination that there are no messages for said one or more sockets associated with said application in said memory space.

32. The non-transitory computer-readable storage medium of claim 23, wherein said polling of said shared device queue is disabled upon a determination made by a guest operating system to stop running the application.

33. The non-transitory computer-readable storage medium of claim 23, wherein said polling of said shared device queue is disabled upon a determination made by said host operating system to stop running at least a part of said hypervisor, said part of said hypervisor being responsible for running said application, or said part of said hypervisor being responsible for passing messages from said shared device queues to said application.

* * * * *